United States Patent [19]
Peurach et al.

[11] Patent Number: 6,131,097
[45] Date of Patent: Oct. 10, 2000

[54] HAPTIC AUTHORING

[75] Inventors: Thomas M. Peurach, Novi; Todd Yocum, Ann Arbor; Douglas Haanpaa, Ann Arbor; Charles J. Jacobus, Ann Arbor, all of Mich.

[73] Assignee: Immersion Corporation, San Jose, Calif.

[21] Appl. No.: 08/859,877

[22] Filed: May 21, 1997

Related U.S. Application Data

[63] Continuation-in-part of application No. 08/543,606, Oct. 16, 1995, Pat. No. 5,629,594, which is a continuation-in-part of application No. 08/257,070, Jun. 9, 1994, Pat. No. 5,459,382, which is a division of application No. 07/984,324, Dec. 2, 1992, Pat. No. 5,389,865, and a continuation of application No. 08/854,375, May 12, 1997.
[60] Provisional application No. 60/018,037, May 21, 1996.

[51] Int. Cl.⁷ .................................................. G06F 17/30
[52] U.S. Cl. ................................... 707/102; 707/104
[58] Field of Search ....................... 707/102, 104

[56] References Cited

U.S. PATENT DOCUMENTS

| | | | |
|---|---|---|---|
| 3,919,691 | 11/1975 | Noll | 340/172.5 |
| 4,604,016 | 8/1986 | Joyce | 414/7 |
| 4,795,296 | 1/1989 | Jau | 414/5 |
| 4,982,918 | 1/1991 | Kaye | 244/223 |
| 5,004,391 | 4/1991 | Burdea | 414/6 |
| 5,007,300 | 4/1991 | Siva | 74/471 XY |
| 5,018,922 | 5/1991 | Yoshinada et al. | 414/5 |
| 5,044,956 | 9/1991 | Behensky | 434/45 |
| 5,062,594 | 11/1991 | Repperger | 244/175 |
| 5,103,404 | 4/1992 | McIntosh | 318/568.22 |
| 5,116,180 | 5/1992 | Fung et al. | 414/5 |
| 5,142,931 | 9/1992 | Menahem | 74/471 XY |
| 5,143,505 | 9/1992 | Burdea et al. | 414/5 |
| 5,146,566 | 9/1992 | Hollis, Jr. et al. | 395/275 |
| 5,180,351 | 1/1993 | Ehrenfried | 482/52 |
| 5,185,561 | 2/1993 | Good et al. | 318/432 |
| 5,186,629 | 2/1993 | Rohen | 434/114 |
| 5,220,260 | 6/1993 | Schuler | 318/561 |
| 5,223,776 | 6/1993 | Radke et al. | 318/568.1 |
| 5,264,776 | 11/1993 | Gregory et al. | 318/561 |
| 5,382,885 | 1/1995 | Salcudean et al. | 318/568.11 |
| 5,389,865 | 2/1995 | Jacobus et al. | 318/568.11 |
| 5,405,152 | 4/1995 | Katanics et al. | 273/438 |
| 5,451,924 | 9/1995 | Massimino et al. | 340/407.1 |
| 5,459,382 | 10/1995 | Jacobus et al. | 318/568.11 |
| 5,482,051 | 1/1996 | Reddy et al. | 128/733 |
| 5,506,605 | 4/1996 | Paley | 345/163 |
| 5,513,100 | 4/1996 | Parker et al. | 364/167.01 |
| 5,515,919 | 4/1996 | Araki | 345/156 |
| 5,562,572 | 10/1996 | Carmein | 482/4 |
| 5,576,727 | 11/1996 | Rosenberg et al. | 345/179 |
| 5,583,478 | 12/1996 | Renzi | 340/407.1 |
| 5,587,937 | 12/1996 | Massie et al. | 364/578 |

(List continued on next page.)

FOREIGN PATENT DOCUMENTS

WO95/20788 8/1995 WIPO .

OTHER PUBLICATIONS

Fletcher, L.A., and Kasturi, R.; A Robust Algorithm for Text String Separation from Mixed Text/Graphic Images. IEEE Transactions on Pattern Analysis and Machine Intelligence, vol. 10, No. 6, Nov. 1988; pp. 910–918.

(List continued on next page.)

*Primary Examiner*—Wayne Amsbury
*Attorney, Agent, or Firm*—Gifford, Krass, Groh, Sprinkle, Anderson & Citkowski, PC

[57] ABSTRACT

Methods are presented for authoring geometrical databases which incorporate touch or haptic feedback. In particular, a database of geometrical elements incorporates attributes necessary to support haptic interactions such as stiffness, hardness, friction, and so forth. Users may instantiate objects designed through CAD/CAM environments or attach haptic or touch attributes to subcomponents such as surfaces or solid sub-objects. The resulting haptic/visual databases or world-describing models can then be viewed and touched using a haptic browser or other appropriate user interface.

58 Claims, 9 Drawing Sheets

U.S. PATENT DOCUMENTS

| | | | |
|---|---|---|---|
| 5,588,139 | 12/1996 | Lanier et al. | 395/500 |
| 5,589,828 | 12/1996 | Armstrong | 341/20 |
| 5,589,854 | 12/1996 | Tsai | 345/161 |
| 5,619,180 | 4/1997 | Massimino et al. | 340/407.1 |
| 5,623,582 | 4/1997 | Rosenberg | 395/99 |
| 5,623,642 | 4/1997 | Katz et al. | 395/500 |
| 5,625,576 | 4/1997 | Massie et al. | 364/578 |
| 5,666,473 | 9/1997 | Wallace | 345/420 |
| 5,691,898 | 11/1997 | Rosenberg | 364/190 |
| 5,709,219 | 1/1998 | Chen et al. | 128/782 |
| 5,714,978 | 2/1998 | Yamanaka et al. | 345/157 |
| 5,721,566 | 2/1998 | Rosenberg et al. | 345/161 |
| 5,729,249 | 3/1998 | Yasutake | 345/173 |
| 5,734,373 | 3/1998 | Rosenberg et al. | 345/161 |
| 5,742,278 | 4/1998 | Chen et al. | 345/156 |
| 5,755,577 | 5/1998 | Gillio | 434/262 |
| 5,767,836 | 6/1998 | Rosenberg | 345/161 |
| 5,769,640 | 6/1998 | Jacobus et al. | 434/262 |
| 5,790,108 | 8/1998 | Salcudean et al. | 345/184 |
| 5,802,353 | 9/1998 | Avila et al. | 395/500 |
| 5,805,140 | 9/1998 | Rosenberg et al. | 345/161 |
| 5,825,308 | 10/1998 | Rosenberg | 341/20 |
| 5,844,392 | 12/1998 | Peurach et al. | 318/568.17 |
| 5,889,670 | 3/1999 | Schuler et al. | 364/186 |

OTHER PUBLICATIONS

Cavnar, W.B., Vayda, A.J., "Using Superimposed Coding of N–Gram Lists for Efficient Inexact Matching". Proceedings of the Fifth Advanced Technology Conference, Washington D. C., Nov. 1992, pp. 253–267.

Iwaki, O., Kida, H., and Arakawa, H.; *A Segmentation Method Based on Office Document Hierarchical Structure*. Proceedings of the IEEE International Conference on Systems, Man, and Cybernetics; Oct. 1987; pp. 759–763.

Fisher, J.L., Hinds, S.C., D'Amato, D.P.; *A Rule–Based System for Document Image Segmentation*. Proceedings of the IEEE 10th International Conference on Pattern Recognition, Jun. 1990; pp. 567–572.

Wong, K.Y., Casey, R.G., and Wahl, F.M.; *Document Analysis System*. IBM Journal of Research and Development, vol. 26, No. 6, 1982; pp. 647–656.

Lu, C.; *Publish It Electronically*. Byte Magazine, Sep. 1993; pp. 95–109.

Zlatopolsky, A.A.; *Automated Document Segmentation*. Pattern Recognition Letters, vol. 15, Jul. 1994; pp. 699–704.

Mantelman, L.; *Voting OCR: Three (or More) Engines Are Better Than One*. Imaging Magazine, vol. 3, No. 12, Dec. 1994; pp. 28–32.

Wayner, P.; *Optimal Character Recognition*. Byte Magazine, Dec. 1993; pp. 203–210.

UNLV/Information Science Research Institute, 1994 Annual Report, University of Nevada, Las Vegas, Apr. 1994.

van der Merwe, N.; *The Integration of Document Image Processing and Text Retrieval Principles*. The Electronic Library, vol. 11, No. 4/5, Aug./Oct. 1993: pp. 273–278.

Nartker, T.A. Rice, S.V., and Kanai, J.; *OCR Accuracy: UNLV's Second Annual Test*. Inform Magazine, Jan. 1994; pp. 40–45.

Nartker, T.A. and Rice, S.V.; *OCR Accuracy, UNLV's Third Annual Test*. Inform Magazine, Sep. 1994; pp. 30–36.

Wahl, F.M., Wong, K.Y. and Casey, R.G.; *Block Segmentation and Text Extraction in Mixed Text/Image Documents*. Computer Vision, Graphics and Image Processing, vol. 20, 1982; pp. 375–390.

Wang, D. and Srihari, S.N.; *Classification of Newspaper Image Blocks Using Texture Analysis*. Computer Vision, Graphics and Image Processing, vol. 47, 1989; pp. 327–352.

O'Gorman, L.; *The Document Spectrum for Page Layout Analysis*. IEEE Transactions on Pattern Analysis and Machine Intelligence, vol. 15, No. 11, Nov. 1993; pp. 1162–1173.

Pavlidis, T., and Zhou, J.; *Page Segmentation and Classification*. CVGIP: Graphical Models and Image Processing, vol. 54, No. 6, Nov. 1992; pp. 484–496.

Saitoh, T., Pavlidis, T.; *Page Segmentation Without Rectangle Assumption*. Proceedings IEEE 11th International Conference on Pattern Recognition, Sep. 1992; pp. 277–280.

Perry, A. and Lowe, D.G.; *Segmentation of Textured Images*. Proceedings of the IEEE Computer Society Conference on Computer Vision and Pattern Recognition, 1989; pp. 326–332.

Shih, F.Y., Chen, S., Hung, D.C.D., Ng. P.A.; *A Document Segmentation, Classification and Recognition System*. Proceedings IEEE of the Second International Conference on Systems Integration—ICSI, 1992; pp. 258–267.

Saitoh, T., Yamaai, T., and Tachikawa, M.; *Document Image Segmentation and Layout Analysis*. IEICE Transactions on Information and Systems, vol. E77–D, No. 7, Jul. 1994; pp. 778–784.

Smith, Geoffrey, "Call It Palpable Progress," Business Week, Oct. 9, 1995, p. 93–96.

Ouh–young, Ming et al., "Using a Manipulator for Force Display in Molecular Docking", IEEE 1988, pp. 1824–1829.

Iwata, Hiroo et al., "Volume Haptization", IEEE 1993, pp. 16–18.

Arps, R. B., and Truong, T.K.; *Comparison of International Standards for Lossless Still Image Compression*. Proceedings of the IEEE, vol. 82, No. 6, Jun. 1994, pp. 889–899.

Baird, H.S., Jones, S.E., Fortune, S.J.; *Image Segmentation by Shape–Directed Covers*. Proceedings of the IEEE 10th International Conference on Pattern Recognition, Jun. 1990; pp. 567–572.

Heid, J.; Page to Pixel. MacWorld, Jul. 1992; pp. 174–181.

Clark, M. and Bovik, A.C.; *Experiments in Segmenting Text on Patterns Using Localized Spatial Filters*. Pattern Recognition, vol. 22, No. 6, 1989; pp. 707–717.

Jain, Anil K. and Bhattacharjee, Sushil; *Text Segmentation Using Gabor Filters for Automatic Document Processing*. Machine Vision and Applications, vol. 5, 1992; pp. 169–184.

Diehl, S. and Eglowstein, H. *Tame the Paper Tiger*. Byte Magazine, Apr. 1991; pp. 220–238.

Hampel, H., Arps, R.B., et al.; *Technical features of the JBIG standard for progressive bi–level image compression*. Signal Processing: Image Communication, vol. 4, No. 2, Apr. 1992, pp. 103–111.

Farrokhnia, F. and Jain, A.K.; *A Multi–Channel Filtering Approach to Texture Segmentation*. Proceedings of the IEEE Computer Vision and Pattern Recognition Conference, Jun. 1991; pp. 364–370.

Adachi, Y., "Touch & Trace on the Free–Form Surface of Virtual Object", Proceedings of IEEE Virtual Reality Annual International Symposium (Sep. 18–22, 1993, Seattle WA) pp. 162–168.

Adlestein, Bernard D. et al., "Design & Implementation of a Force Reflecting manipulandum for Manual Control Research", 1992, pp. 1–24.

Bejczy, Antal K., "The Phantom Robot: Predictive Displays for Teleoperation with Time Delay", IEEE 1990, pp. 546–550.

Iwata, Hiroo, "Pen–Based Haptic Virtual Environment" Proceedings of IEEE Virtual Reality Annual International Symposium (Sep. 18–22, 1993, Seattle, Washington).

Kotoku, Tetsue et al., "Environment Modeling for the Interactive Display (EMID) Used in Telerobotic Systems", IEEE Nov. 3–5, 1991, pp. 999–1004.

Burdea, Grigore et al., "Dextrous Telerobotics with Force Feedback—An Overview", Robotica 1991, vol 9.

Hannaford, Blake et al., "Performance Evaluation of a Six–Axis Generalized Force–Reflecting Teleoperator", IEEE May/Jun. 1991, vol. 21, Nov. 3, pp. 620–633.

Fischer, Patrick et al., "Specification and Design of Input Devices for Teleoperation", 1990.

Colgate, J. Edward et al., "Implementation of Stiff Virtual Walls in Force–Reflecting Interfaces", Sep. 22, 1993, pp. 1–9.

Tan, Hong Z., et al., "Human Factors for the Design of Force–Reflecting Haptic Interfaces," Tan, Srinvasan, Eberman, & Chang, ASME WAM 1994, pp. 1–11.

Buttolo, Pietro et al., "Pen–Based Force Display for Precision Manipulation in Virtual Environments", IEEE, Mar. 1995, pp. 1–8.

Kim, Won S. et al., "Graphics Displays for Operator Aid in Telemanipulation", IEEE 1991, pp. 1059–1067.

Rosenberg. Louis B., "Perceptual Design of a Virtual Rigid Surface Contact," Center for Design Research, Stanford U., Armstrong Laboratory, AL/CF–TR–1995–0029, Apr. 1993.

Ouh–young, Ming et al., "Force Display Performs Better than Visual Display in a Simple 6–D Docking Task", IEEE 1989, pp. 1462–1466.

Rosenberg, Louis B. et al., "Perceptual Decomposition of Virtual Haptic Surfaces," IEEE, Oct. 1993.

Pavlidis, T., and Zhou, J.; *Page Segmentation and Classification*. CVGIP: Graphical Models and Image Processing, vol. 54, No. 6, Nov. 1992; pp. 484–496.

Saitoh, T., Pavlidis, T.; *Page Segmentation Without Rectangle Assumption*. Proceedings IEEE 11th Conference on Pattern Recognition, Sep. 1992; pp. 277–280.

Perry, A. and Lowe, D.G.; *Segmentation of Textured Images*. Proceedings of the IEEE Computer Society Conference on Computer Vision and Pattern Recognition, 1989; pp. 326–332.

A. Kelly, S. Salcudean, "MagicMouse: Tactile and Kinesthetic Feedback in the Human–Computer Interface Using an Electromagnetically Actuated Input/Output Device," University of British Columbia, Oct. 1993.

A. Kelly, S. Salcudean, "On the Development of a Force–Feedback Mouse and its Integration into a Graphical User Interface," Nov. 1994.

B. Schult, R. Jebens, "Application Areas for a Force–Feedback Joystick," ASME 1993, pp. 47–54.

M. Minsky, M Ouh–young, L. Steele, F. Brooks, Jr., M. Behensky, "Feeling and Seeing: Issues in Force Display," pp. 235–42. (no date).

M. Russo, "The Design and Implementation of a Three Degree–of–Freedom Force Output Joystick," May 1990.

L. Rosenberg, "A Force Feedback Programming Primer," 1997.

J. Payette, "Evaluation of a Force Feedback (Haptic) Computer Pointing Device in Zero Gravity," ASME 1996, pp. 547–53.

B. Hannaford, Z Szakaly, "Force–Feedback Cursor Control, " NASA Tech Brief, vol. 13, No. 11, Item No. 21, Nov. 1989.

C. Ramstein, V. Hayward, The Pantograph: A Large Workspace Haptic Devcie for a Multimodal Human–Computer Interaction, Computer–Human Interaction, CHI, 1994.

Y. Yokohohji, R. Hollis, T. Kanade, "What You Can See is What You Can Feel–Development of a Visual/Haptic Interface to Virtual Environment," Proceedings of VRAIS pp. 46–54.

L. Rosenberg, S. Brave, "The Use of Force Feedback to Enhance Graphical User Interfaces," Proc. SPIE 2653, vol. 19, pp. 243–24.8.

H. Iwata, Artificial Reality with Force–Feedback: Development of Desktop Virtual Space with Compact Master Manipulator, Computer Graphics, vol. 24, No. 4, Aug. 1990, pp. 165–70.

S. Su, R. Furuta, "The Virtual Panel Architecture: A 3D Gesture Framework," pp. 387–393. (no date).

G. Burdea, E. Roskos, D. Gomez, N. Langrana, P. Richard, "Distributed Virtual Force Feedback," May 1993, pp. 25–44.

T. Kotoku, "A Predictive Display with Force Feedback and its Application to Remote Manipulation System with Transmission Time Delay," Proc. IEEE 1992, pp. 239–46.

R. Ellis, O. Ismmaeil, G. Lipsett, "Design and Evaluation of a High–Performance Prototype Planar Haptic Interface," ASME Dec. 1993, pp. 55–64.

L. Rosenberg, T. Lacey, D. Stredney, M. VanDerLoss, "Commercially Viable Force Feedback Controller for Individuals with Neuromotor Disabilities," U.S. Air Force Final Report, Oct. 1995–May 1996.

P. Kilpatrick, "The Use of Kinesthetic Supplement in an Interactive Graphics System," Univ. of North Carolina at Chapel Hill, 1976.

G. Winey III, "Computer Simulated Visual and Tactile Feedback as an Aid to Manipulator and Vehicle Control," Mass. Institute of Technology, Jun. 1981.

K. Hirota, M. Hirose, "Development of Surface Display," IEEE 1993, pp. 256–62.

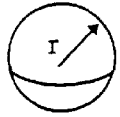

Sphere
Parameters: r, radius

Bounding Box: +/- r
Contact: avatar point less than radius

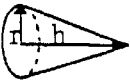

Cone
Parameters: r, radius, h, height

Bounding Box: is same as Cylinder
Contact: perpendicular drop point between endpoints of centerline and perpendicular drop distance less than the cone radius at the centerline drop point.

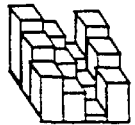

Voxel
Parameters: array values

Bounding Box: array size

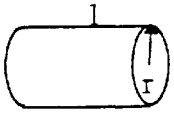

Cylinder
Parameters: r, radius, l, length

Bounding Box: +/- r, +/- r, +/-l/2
Contact: perpendicular drop to centerline less than r and drop point between endpoints of centerline

Box
Parameters: l, length, w, width, h, height

Bounding Box: +/- l/2, h/2, w/2
Contact: avatar within bounding limits

Polygonal Models
Parameters: vertex list, connectivity list

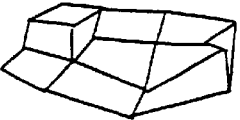

Bounding Box: maximum x, minimum x, maximum y, minimum y, maximum z, minimum z (plus sub-boxes and per-polygon boxes)

B-Spline Patch Models
Parameters: vertex list, connectivity list

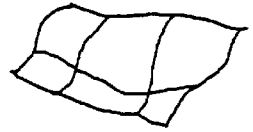

Bounding Box: maximum x, minimum x, maximum y, minimum y, maximum z, minimum z (plus sub-boxes and per-polygon boxes)

*Figure - 4*

```
(World Poly_21
    (Object 1
        (Poly 1 (Edges 1 1 2 3 7 7 9 9) RED (Hardness 21))
        (Poly 1 (Edges 15 20 33 33 56 8) RED (Hardness 21))
        (Poly 1 (Edges 3 3 5 6 3 3 2 1) RED (Hardness 21))
    )
    (Object 2
        (Sphere 2 (Center 21 33 40) (Radius 20) GREEN (Stiffness 2))
        (Box 3 ...  (Stiffness 21) (Hardness 3))
    (Object 3
        http://www.cybernet.com/cyberobject.vrml
    )
)

(Cyberobject
    additional object description data
)
```

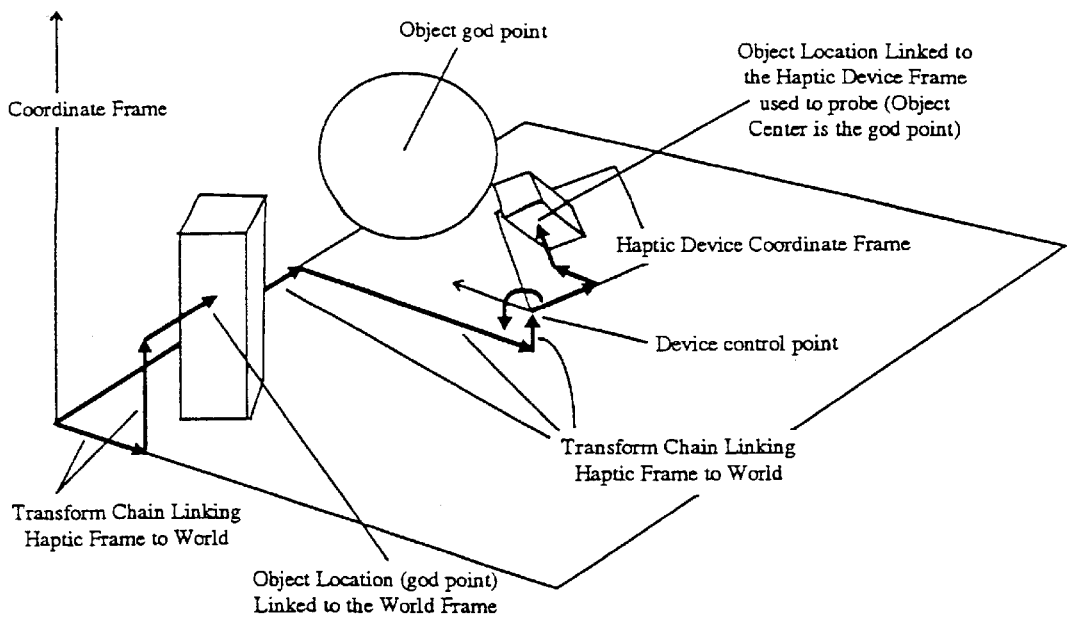
Figure - 9
Figure - 10
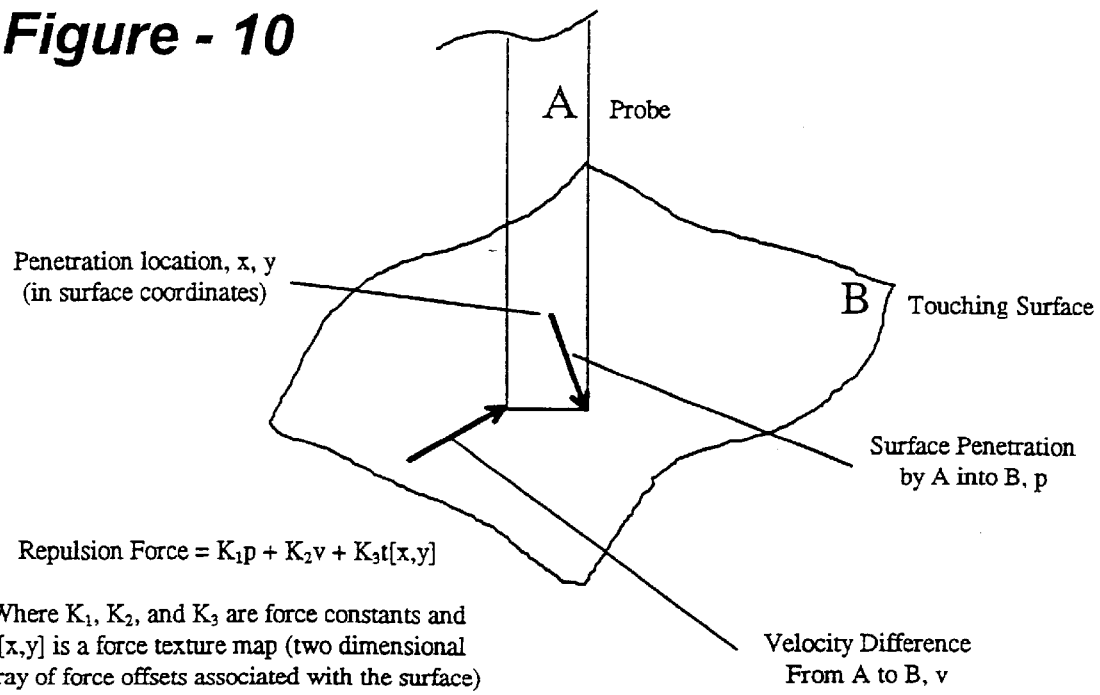

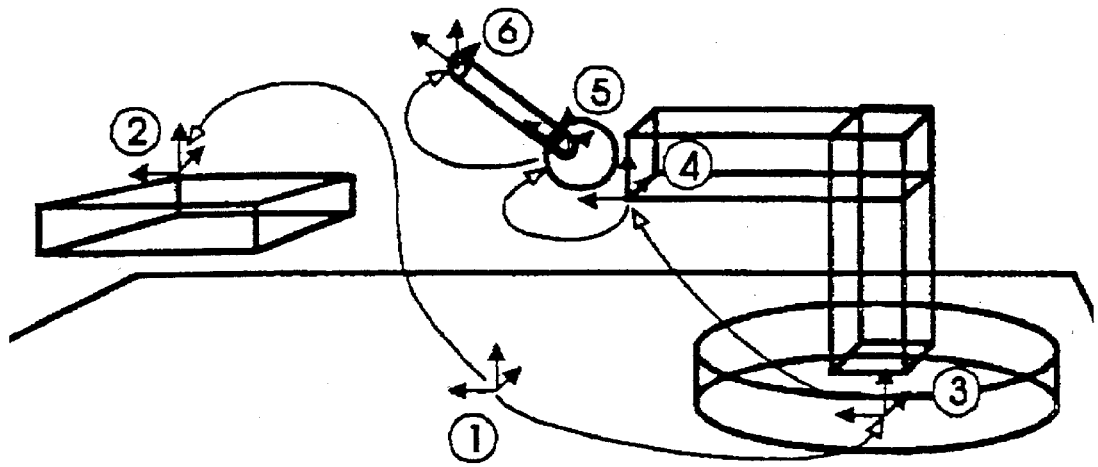
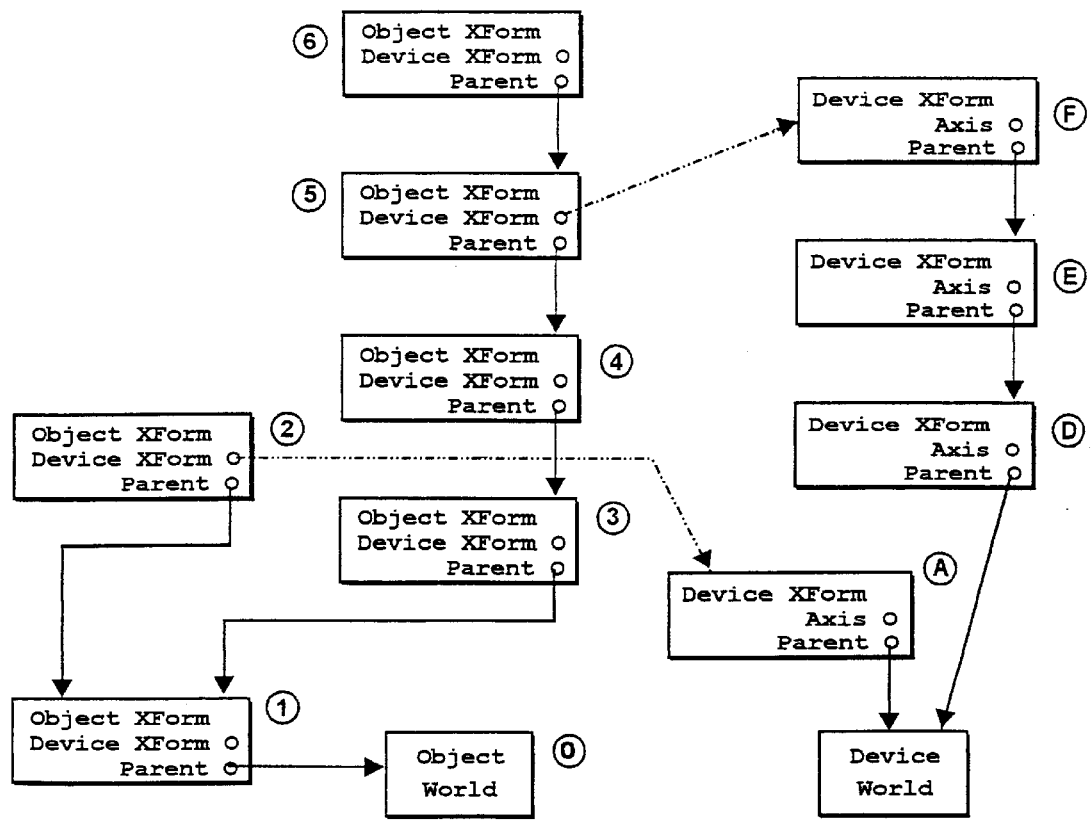
Figure - 11
*(ENTIRE SHEET)*

Figure - 13
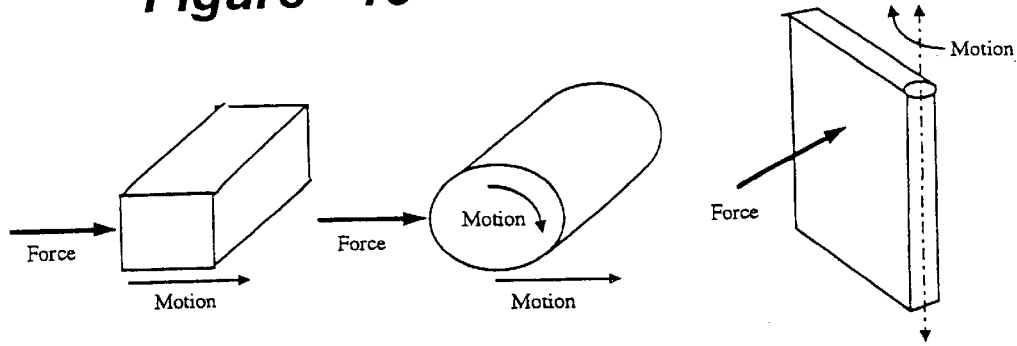
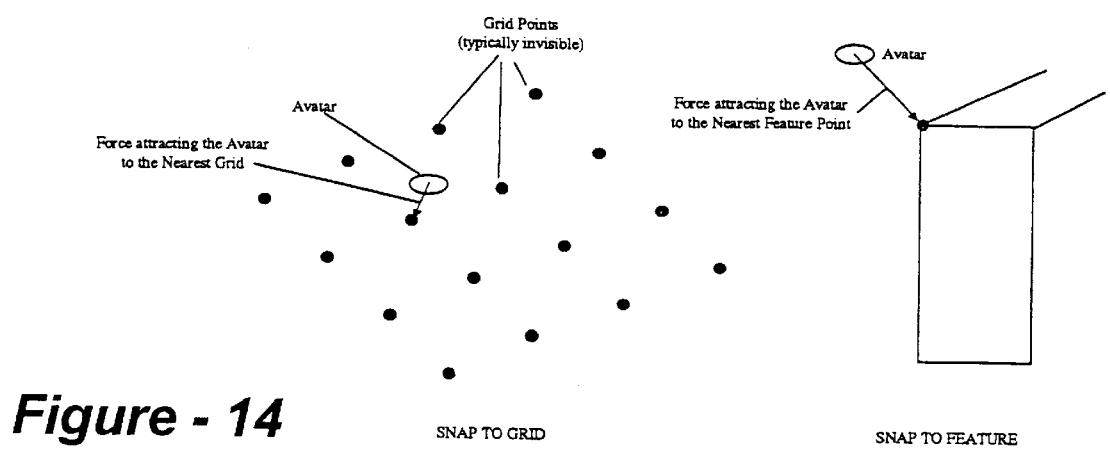
Figure - 14
SNAP TO GRID                    SNAP TO FEATURE
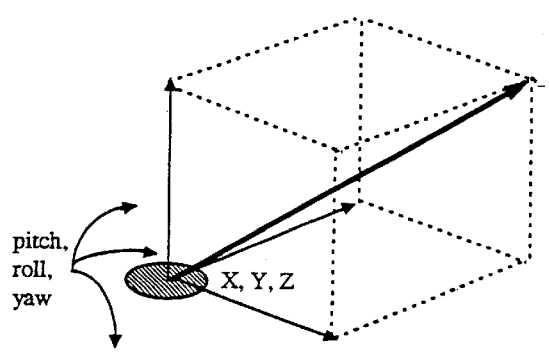
Figure - 12
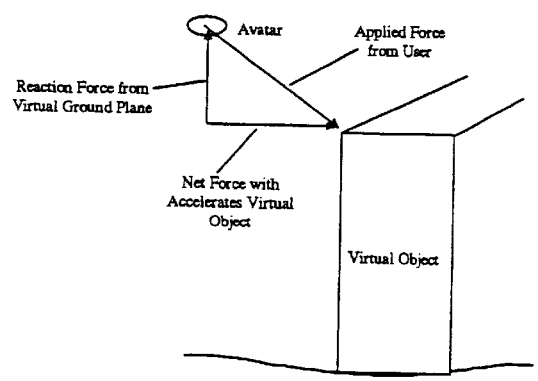
Figure - 15

Force Texture Map Array    Surface Component of an Object

HAPTIC AUTHORING

REFERENCE TO RELATED APPLICATION

This application claims priority of U.S. Provisional Application Ser. No. 60/018,037, filed May 21, 1996, and U.S. patent application Ser. No. 08/854,375 filed May 12, 1997 which is a continuation of U.S. patent application Ser. No. 08/543,606, filed Oct. 16, 1995, now U.S. Pat. No. 5,629,594, which is a continuation-in-part of U.S. patent application Ser. No. 08/257,070, filed Jun. 9, 1994, now U.S. Pat. No. 5,459,382, which is a divisional of U.S. patent application Ser. No. 07/984,324, filed Dec. 2, 1992, now U.S. Pat. No. 5,389,865, the entire contents of all of which are incorporated herein by reference.

FIELD OF THE INVENTION

This invention relates generally to force-feedback and haptic devices and, in particular, to the authoring of world models which incorporate haptic and visual integration.

BACKGROUND OF THE INVENTION

Specialized force-feedback devices originated in the 1960's with the introduction of teleoperations, wherein, typically, a smaller controller or master robot was moved by an operator to control the movements of a larger slave robot. Forces detected at the slave were then fed back to the operator through actuators at the location of the master. Such prior art is discussed in U.S. Pat. Nos. 5,389,865, 5,459,382 and 5,629,594 to Jacobus, et al, and also described elsewhere in the literature.

In the late 1980's, NASA funded several programs using force feedback devices which were not identically configured as miniature versions of a slave device. This advance enabled an operator such as an astronaut to control a number of different space-based robots and cranes from a "universal" controller. To realize this concept, the master controller was logically connected to the slave through a network of computers which were capable of translating the master kinematics typically into Cartesian coordinates and from Cartesian to slave kinematics (and back again).

With such computer translation in place on the master side of the system, it becomes possible to send inputs from the master, be it a joystick, wheel, yoke, or other type of manipulator, to a simulated slave rather than to a real one, and to accept forces from the simulation for application to the master as well. The simulation need not represent a real device, like a crane or robot, but may be a simulated vehicle, weapon or other implement. The simulation may also reside in a person performing a task in a virtual world such as walking, handling objects, and touching surfaces. Such innovations are among those disclosed in the patents referenced above.

As force-feedback technology proliferates, haptic interfaces will need to accommodate numerous different controllers and environments. The issued patents referenced above disclose multi-degree of freedom controllers for use in various representative configurations, including totally self-contained configurations. At the same time, tools and techniques will need to be created to provide consistency in developing and improving haptic applications.

Toward these ends, co-pending U.S. application Ser. No. 08/859,157 provides means for adjusting behavioral attributes associated with haptic device control, whether during development or execution, and co-pending U.S. application Ser. No. 08/861,080 discloses architectures and features relating to "browsers," wherein common geometrical descriptions are shared among visual and haptic rendering functions. Both of these applications are incorporated herein in their entirety by reference. The need remains, however, for methods, data structures, and control strategies to organize the development of world models driven by these integrated haptic/visual environments.

SUMMARY OF THE INVENTION

The present invention resides in authoring tools which allow a user to create or import existing geometry files, attach haptic or other attributes to the object components of the files, and browse file contents in final or intermediate states of composition. The final edited world files may be written to disk or exported over networks, preferably in standardized formats, including hyperlinks over the world-wide web, to applications programs which incorporate visual, haptic, and/or sound capabilities, enabling other users view, touch, attached to, and manipulate the objects.

In a preferred embodiment, the invention incorporates a distinct set of facilities for reading, writing, browsing, navigating, and/or editing databases which encode hierarchical geometric data, so as to combine surface attribution and touch or haptic attribution. To enhance these functions, visual/haptic avatar may be provided to assist in designating a user's position in the virtual world being edited.

Applied forces may be used to aid a user in a number of ways, including the following:

moving a point to a particular discrete grid position (snap to grid);

moving to a geometrical object control point of feature (end points of a line, center of a circle, radius of a circle, control points of a b-spline, etc.);

to resist stretching or compression of a feature (i.e., programmable stiffness or elasticity);

to resist user actions (through viscosity, friction, repulsive force);

to help in aligning a new object with respect to an existing one (with or without knowledge of coordinate values needed for most equivalent operations); or to support material removal, as in carving or scraping operations.

Forces may also be used to demark the locations of menu items, dialog response locations, and icons (similar to use of forces to aid in locating control points or grid locations), or to maintain orientation or positional constraints while performing another operation.

The invention further supports the use of transform and object hierarchy for coding haptic world and object databases, as well as machine independent program description languages for haptic authoring system communications interfacing and control algorithms, independent of computer/operating system, control device type and communications systems.

BRIEF DESCRIPTION OF THE DRAWINGS

FIG. 4 illustrates primitive force generating objects and their descriptive parameters;

FIG. 9 is an oblique drawing used to illustrate fixed and movable objects, transform chains and coordinate point definitions;

FIG. 10 illustrates force generation from object surface penetration;

FIG. 11 depicts a transform and object hierarchy for a typical haptic device;

FIG. 12 illustrates flying in six degrees of freedom;

FIG. 13 shows pushing, rolling, and opening as examples of force-based tasks;

FIG. 14 shows how an avatar may be moved so as to snap to a grid or feature point;

FIG. 15 illustrates how alignment may be maintained during motion according to the invention;

DETAILED DESCRIPTION OF THE INVENTION

Figure 1:
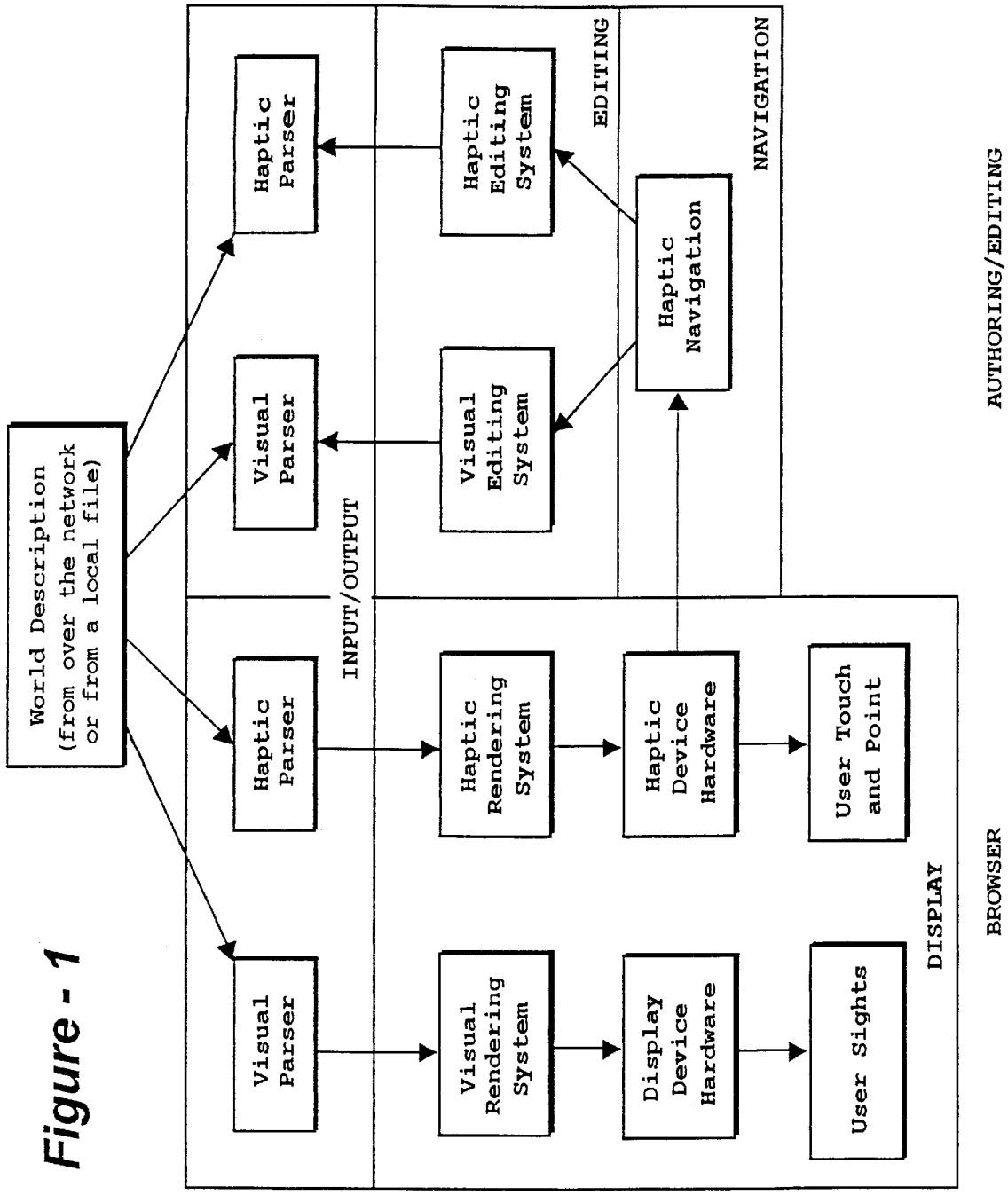
FIG. 1 presents basic elements associated with a haptic/visual authoring tool.

U.S. Pat. Nos. 5,459,382, 5,389,865 and 5,629,594 disclose devices and methods for providing users with a touch or tactile interface into a virtual world including virtual objects; that is, objects which are not real, but rather, are defined by a computer, model or simulation. The present invention builds on these teachings by facilitating tactical interaction with geometric objects described within a virtual world representation using a geometric probe logically attached to the haptic or tactile device (FIG. 1). This touch support representation is synchronized with a comparable representation of the world for visualization or graphical rendering, thereby enabling the world to be both seen and touched. Extending this analogy to nomenclature associated with visualization, the generation of forces from the act of touching virtual objects is referred to herein as haptic rendering, and the act of both touching and viewing the objects (or other data) is referred to as haptic browsing.

Figure 2:
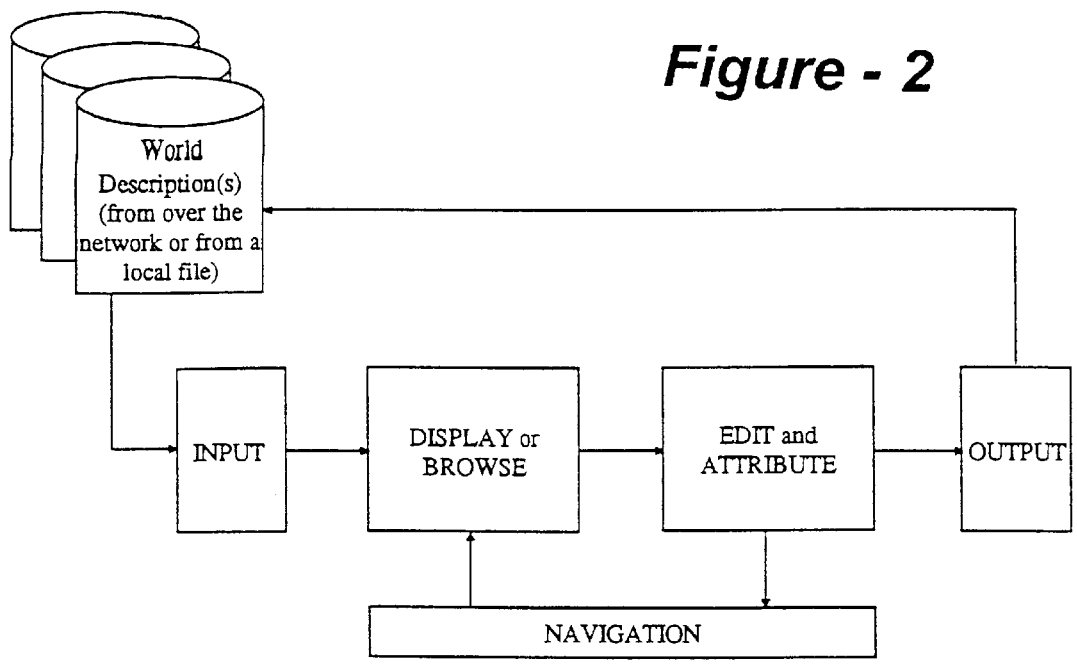
FIG. 2 is a flow-chart representation of a method of the invention.
Figure 3:
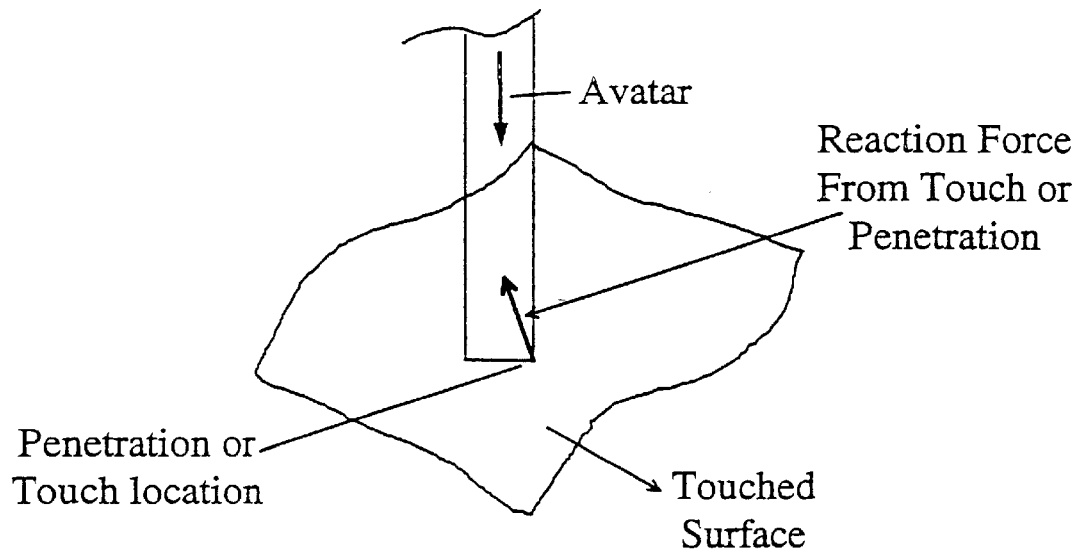
FIG. 3 is a diagram which shows an avatar interacting with a virtual object, generating responsive forces.

FIG. 2 presents the basic elements of a haptic/visual browser according to the invention, and FIG. 3 is a flow chart which represents an attendant method. In particular, FIG. 3 shows how a physical device may be connected through a control arrangement to a simulated or virtual environment. Position, velocity, and/or acceleration are measured at the controller (and therefore also from the user), and these values are sent to a computer controller bound to a virtual geometrical element or "probe." This probe, which may be alternatively referred herein as an "avatar," moves through the virtual environment, occasionally approaching or touching elements having mathematically described geometries within the environment.

When the avatar collides with a virtual object (FIG. 4), the collision event generates response forces, which, in turn, cause the controller to move to updated position, velocity, and acceleration states, thereby conveying the collision event to the user by providing a feeling for the objects associated with the collision. This process, referred to as haptic rendering, generates forces based upon geometric descriptions and touching point locations. Note, however, that an actual collision can be replaced by proximity, entry into/out of a field, such as magnetic or gravimetric, or entry into a new medium, such as from air to water. In addition, since avatar (and haptic device or controller) position, velocity, and acceleration states are made available to the virtual reality simulation, the avatar position and other simulated state changes can be stimulated through user motion and collision events.

Concurrently with maintaining avatar and static geometry data, the geometry data is preferably also used to generate three-dimensional, viewable imagery. Although conventional visual rendering is well known, unique to this invention, are processes associated with haptic rendering, including the way in which such rendering is synchronized with visual rendering so as to effect a multi-media (i.e., touch and sight) immersive virtual reality.

Figures 5, 6:
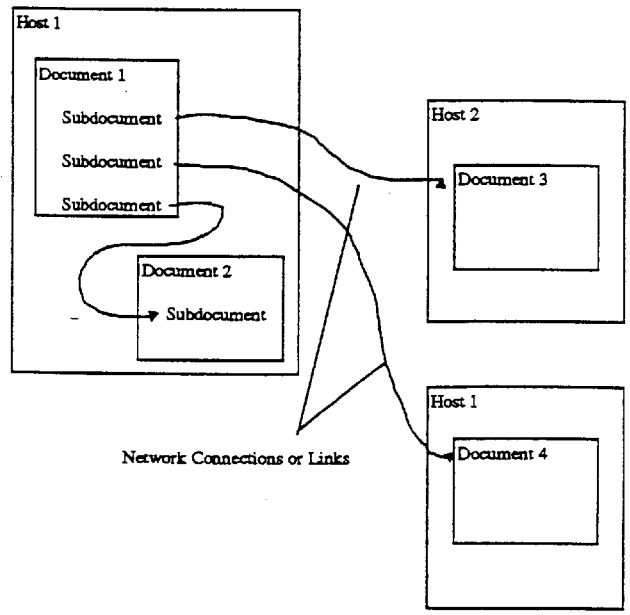
FIG. 5 illustrates haptic/visual browser object hierarchical description files.
FIG. 6 shows where files for browsing may be located.

The concept of geometrical database browsing arises in part from the recognition that the geometric data which is loaded into the virtual world, thus initializing it, described as a hierarchy of objects may be described as statements or records in files (FIG. 5). As shown in FIG. 4, such data may represent simple objects, polygon arrays, and/or b-spline patches. As files, which may take the form of a collection or records or a single record, an object description can be read into memory for instantiation into the virtual world (by sending parsed forms of these records to the haptic rendering processing routines or the visual rendering processing routines), can be moved to different spots or named locations within the files system, or can be sent over a network (FIG. 6). Haptic/visual browsing is the function of reading the geometry description files from any source and causing them, under user direction, to be rendered visually in a haptic sense, and optionally, with sound generation or other characteristics as well.

The actual form of the geometrical database can be application-specific, as in the case of many CAD/CAM system databases, or can represent an industry standard such as DXF (the AutoCAD exchange format), IGES or PDES (industry standard graphics and product design formats), and/or VRML (a standard graphics format used to represent objects and object hierarchies for downloading and browsing over the Internet World Wide Web—typically in conjunction with HTML, the World Wide Wed Hypertext Mark-Up Language). Since the external file format is translated into a common internal form through format-specific translators, the methods described herein are format-independent, and include all representative forms.

This invention discloses methods associated with the creation of data structures and other elements which include haptic (i.e., relating to touch), visual and perhaps other information. As disclosed in co-pending U.S. application Ser. No. 08/861,080 a haptic browser will typically include a database reading/parsing function (FIG. 3), a geometry instantiation function for static and dynamic entities, a simulation core for creating behaviors of dynamic entities, a rendering function for visual, haptic, and possibly sound entities, and a user(s) interactions function which allows the user to move freely within the virtual environment being browsed and potentially attach to one or more dynamic entities in the world.

The database reading function can acquire information from files local to a particular computer, as would be typical in browsing a 3D CAD/CAM file, or may acquire the input from over a network such as the Internet. In any case, the file or data will be coded in a standard geometrical file format, including DXF (AutoCAD exchange format); IGES or PDES (industry standard CAD/CAM formats); or VRML version 1.0 or 2.0 (exchange formats for geometrical data supplied over the World Wide Web). The parsing portion of the reader converts the file format into specific data items needed to be instantiated, or to hand-off data describing geometrical elements to the haptic rendering system previously described, or a visual rendering system such as Microsoft Direct3D or OpenGL from Silicon Graphics.

FIG. 5 shows a conceptual graphics file format showing a hierarchical object description which might be used by such a browser. Attached to each item is a property list describing item visual and haptic characteristics. The haptic browser differs from a normal visual browser in the inclusion of the haptic characteristics in these object description files.

If the VRML format is used, one data item allowed in the data format is a hyperlink or URL (FIG. 5) The URL allows logical connection to another VRML or HTML file located on the same computer or another somewhere else over the Internet on the World Wide Web. In this way, traversal of VRML URLs (which are attached as properties of specific objects in the virtual world) can effect traversal from location on the World Wide Web to another (as well as providing entry points into HTML text documents as well).

FIG. 5 shows a conceptual graphics file format including a hierarchical object description. Attached to each item is a property list describing item visual and haptic characteristics. The haptic browser differs from a normal visual browser in the inclusion of the haptic characteristics in these object description files.

If the VRML format is used, one data item allowed in the data format is a hyperlink or URL (FIG. 5) The URL allows logical connection to another VRML or HTML file located on the same computer or another somewhere else over the Internet on the World Wide Web. In this way, traversal of VRML URLs, which are attached as properties of specific objects in the virtual world, can effect traversal from location on the World Wide Web to another, as well as providing entry points into HTML text documents.

Figure 7:
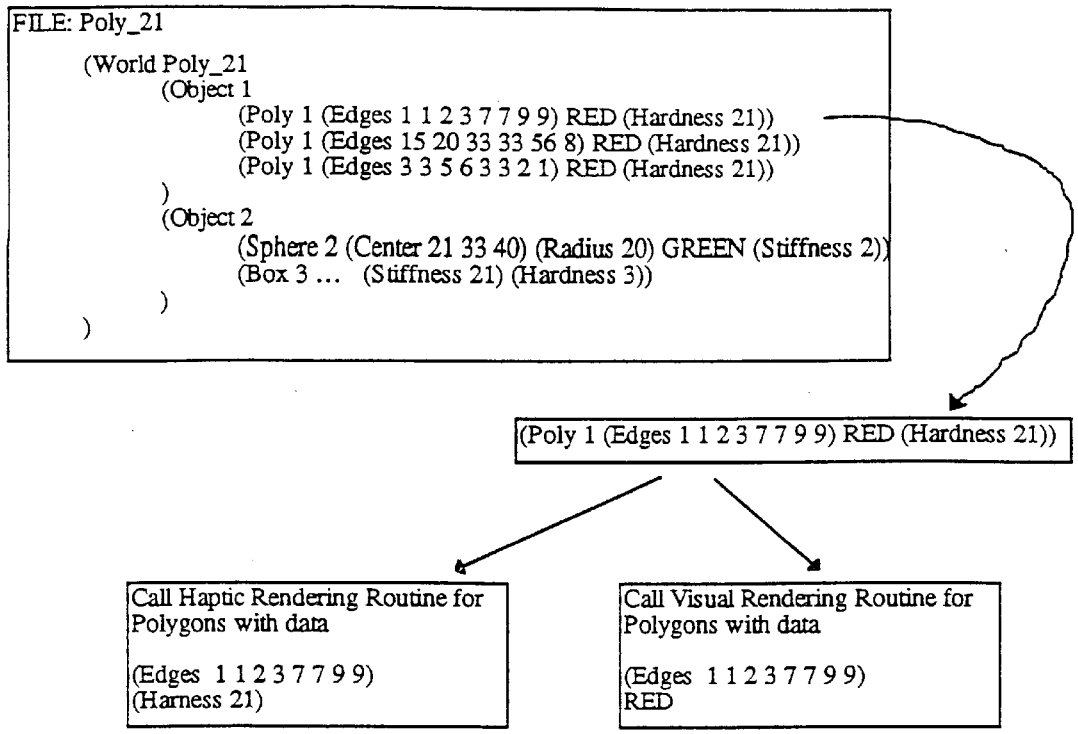
FIG. 7 is a diagram which depicts data flow from an input file to an API to a rendering engine.
Figure 8:
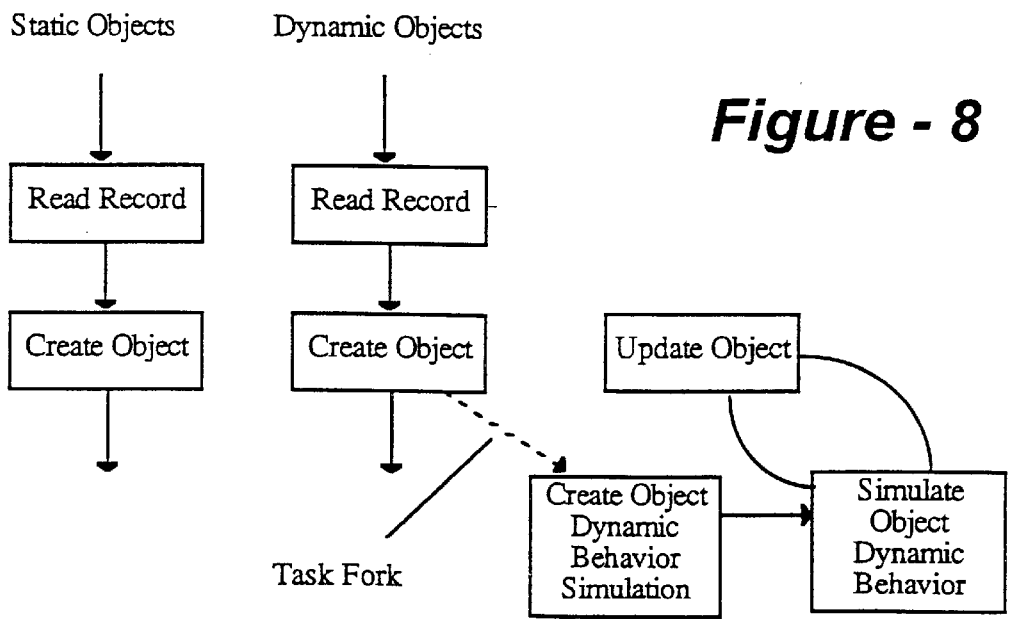
FIG. 8 illustrates static versus dynamic entity processing.

The geometric instantiation portion consists of a code segment which takes values supplied by the parser and makes the application programmer interface calls (API) necessary to create the geometrical entities within the rendering systems, both haptic and visual (FIG. 7). For static, or non-moving entities the calls can be made once for efficiency when a new virtual world segment is being created. However, for each dynamic entity, new calls are needed for every movement of change to be created (FIG. 8).

These changes to dynamic objects are signaled by external message packets from other simulations in a distributed simulation environment, by interaction with the user through the haptic interface device, or by internal simulation code in the simulation core. Motion of dynamic objects requires a simulation evaluation system similar to that originally disclosed in U.S. Pat. No. 5,459,382. However, the results include changes in dynamic object parameters, rather than haptic device output forces. These changes can be manifest at haptic device force outputs if the haptic device is attached to a particular changing dynamic object. Similarly, this attachment process can allow direct control of the attached virtual object through motion of the haptic input device itself.

Controls which provide direct computation of forces in accordance with the interaction of the device position point relative virtual surfaces, such as those described the U.S. Pat. No. 5,459,382, rely on computation algorithms capable of generating forces from planes and conic sections. Extensions to all forms of parametric surfaces, would be apparent to one of skill in the art of computer graphics, including voxel descriptions, arrays of polygons (which may be defined as several planes bounded by lines or edges), and point cloud representations (FIG. 4).

A more detailed description of the way in which geometrical elements are represented in one embodiment may be expressed through the use of two main types of controls. The transform control (abbreviated XFM) computes the transformation matrix responsible for transforming one coordinate system to another. In this manner, a chain of such transforms can be assembled to specify the kinematics of a given haptic device (FIG. 9). The object control (abbreviated OBJ) contains information describing an object in the scene. If the object is placed by the composite device transform mentioned before, the object's position in the scene will be specified by the device orientation.

To create other objects in the scene, other transforms can be created that do not depend upon the device; that is, they may be fixed to a world coordinate space, as shown in FIG. 9. Other objects can also be created and positioned using these transforms. In this manner, a world of objects and their positioning transforms is created, with objects moving as dictated by the device, while other move of their own accord at constant velocity (dead reckoning). Other objects might not move at all, or may move because of an attachment to another moving object.

Often it is desirable to move the device without moving the controlled object, much like lifting the mouse when you have run out of mouse pad. Each transform has the capability to detach itself from its controlling axis so that it does not move with the device, but when it is reattached, it will move to the new position of this axis. To avoid this, the transformations can be based on position changes or deltas rather than positions. In this way, when the device is reattached, the transform will pick up where it left off when it was detached.

The simulation control (abbreviated SIM), monitors the objects in the world that are specified as avatars (moving objects), and determines if they are contacting any other objects in the scene. If so, contact forces are calculated and passed down the tree of transforms that position the avatar object (FIG. 9). Each of the transforms can then decide if it is attached to a device axis, in which case it would generate the appropriate force on that axis in accordance with haptic rendering.

Although all objects may be represented as polyhedrons, this is not the most efficient way to haptically render certain objects whose geometries are well defined and simple. To speed up the process of contact detection, a bounding box is placed around the object to more rapidly rule out distant objects. The defining parameters, as well as the contact detection method and the bounding box generation, is described below for a number of primitive objects. Some of these objects are shown in FIG. 4, along with indications as to relevant object description parameters.

Further elaboration of the haptic rendering process for each avatar may involve the following steps.

For each servo loop:
1. Compare the actual servo rate to the desired servo rate. Calculate the number of sub-loops that need to occur during the current servo loop in order to reach this desired rate. Using the beginning and ending axis data, compute the position deltas for each sub-loop.
In each sub-loop:
Update data for each object and transform.

For each avatar:

A. The position of the proposed god point gets assigned to be the avatar current location in absolute coordinates. The god point has no mass, so it will move all the way to the avatar if there are no obstacles.

For each object:

1. Check proposed god point against absolute bounding cube. Transform the proposed god point into the object's relative coordinate frame. Check against relative bounding box. If the current object is a polyhedron, check individual polygon bounding boxes.

2. If there is contact, separate deformable/non-deformable.

3. Non-Deformable: Construct a path from this object's god point to the current proposed god point. If this relative path crosses the object, remove the component of the path that is in the direction of the surface normal to get a new non-contacting path. Compute the new proposed god point as the object god point+non-contacting path. Store the surface normal so that other non-deformable contacts do not allow motion in this direction either. Alter motion of object and any objects connected to this one by springs. Transform proposed god point back to absolute coordinates.

4. Deformable: Construct a path from this object's god point to the avatar location. If the path crosses this object, remove the component of the path that is in the direction of the surface normal to get the path of the object god point. If there are other avatars touching this object, determine if the object god point for this avatar should be affected. If so, attract the object god point toward the other avatar. Deform the object based on vector from object god point to avatar. Alter motion of object and any objects connected to this one by springs. Transform proposed god point back to absolute coordinates.

5. After all objects have been checked for god point contact, move the god point to the modified proposed god point. Update all non-deformable contacted objects' object god points by transforming the final god point into each one's relative coordinate frame.

6. Loop through all contacted objects. Compute the penetration delta between the avatar and the object god point. Calculate smooth surface vector, if required, by polyhedron smoothing.

7. Refer to next object in list.

B. Force between avatar and object god point will be determined by $K_1 p$ times the penetration delta and $K_2 v$ times the difference in their velocities. Add texture info to force vector (FIG. 10).

C. Repeat the procedure for the required number of sub-loops to complete the overall servo loop.

D. Apply the force at the avatar to the device.

One purpose of the haptic authoring tool is to create data structures such as that shown in FIG. 5, which may then viewed through the browser. Thus, the authoring tool according to this invention preferably includes browser functionality for display as a subset (FIGS. 1 and 2). In addition, the authoring tool includes read-in functions for additional graphics formats (for instance, DXF and IGES for an authoring tools which might extend primary support for VRML file reading and writing), direct user graphics editing facilities, and user interfaces for attaching attributes to specific portions or groupings of the geometrical data.

Attribute specifications (i.e. properties like color, stiffness, hardness, frictions, etc.) are specified in the authoring tool interface using attribute controls for haptics (and visuals) like those described in co-pending U.S. application Ser. No. 08/859,157. Geometrical object editing facilities may take advantage of interaction methods common in CAD/CAM systems and other graphics editors (like ProEngineer, BRL CAD, Alias/Wavefront, etc.) Attribution control or designation is similar to methods used for word modeling tools like Multigen, however are extended to support haptic attribute attachment (FIG. 7).

As shown in FIG. 2, there are four primary components to the inventive haptic authoring tool, which may be summarized as follows:

Input & Output—Reads and writes world descriptions with haptic attributes.

Display—Displays world in various ways to the user.

Navigation—Moves through the world.

Editing—Allows users to modify objects in the world, with an emphasis on haptic attributes.

In addition, developers may wish to mix haptic authoring according to this invention with other visual or sound authoring tools as part of a comprehensive world creation. Accordingly, although haptic authoring is optimized with respect to haptic content, in the preferred embodiment it also include native support for other modalities like sight or sound. As such, although this description focusses on haptic architectures, it should at all times be kept in mind that the invention is expandable to support fully functional world creation including visual, audible, and other attributes.

Haptic Authoring Input & Output

Haptic authoring according to this invention is preferably compatible with various world and object description formats, including open standards such as VRML. To accomodate proprietary world descriptions, the user may rely on a converter from the proprietary format to an open standard (typically available from within a proprietary authoring tool or CAD system). The world description file may already contain haptic attributes (such as stiffness or hardness). The haptic authoring tool writes out the world description file to the same open standard (such as VRML) as was read, however, it adds certain haptic attributes, as shown in FIGS. 5 and 7.

The following object description formats are currently anticipated for use in haptic authoring and/or browsing (FIG. 4):

Sphere

Box

Cylinder

Cone

Polygonal Model

NURBS (and other related parametric spline representation)

Voxel (and other related volume representations)

For object and scene representations not specified, the system preferably performs a conversion to a supported representation that most closely approximates the unsupported format items.

Scene hierarchies are also an essential component of scene descriptions, and are also essential to haptic browsing and authoring. These are also preferably supported by the haptic authoring tool (FIGS. 5, 7, and 11). In keeping with the open standards of the industry, a standard parser is suggested so that developers can easily read and write haptic syntax format.

Haptic Authoring Display or Haptic Browser

The visual display of the authoring tool provides the basic functionality found in many other similar authoring tools.

Various visual rendering modes such as wireframe, shaded polygons, and texture mapping, are implemented. If the developer does not have access to a force-feedback development device, visual cues may be provided to represent the haptic attributes of object in the scene.

In addition to an end-user display, a hierarchical representation is preferably displayed and presented to the author as well, as shown in FIG. 11. This may take the form of a list or tree-like structure that represents the scene description, and gives the author a precise method of manipulating all elements in the scene. This hierarchical structure, which may reside in memory, on a network, or in a file, is converted from a storage format to appropriate calls to the visual and haptic applications developer interface (API), and then rendered as indicated previously and in U.S. application Ser. No. 08/861,080.

Haptic Authoring Navigation

A developer using a force-feedback device during haptic authoring can navigate through a scene with sight and touch much as the end user of a haptic browser. As in visual navigation, modes such as walk and fly are preferably made available with respect to a standard 2 degree-of-freedom tracking device such as a mouse. Greater degrees of freedom offer additional metaphors for moving throughout a scene, however. For instance, flying can include motion in at least six distinct degrees of freedom, X, Y, Z, and pitch, roll, and yaw, as shown in FIG. 12. As shown in FIGS. 10 and 13, haptic touch of specific objects in the world can also activate response forces and can accomplish pushing, rolling, or opening tasks.

Haptic Authoring Editing

Central to haptic authoring is editing, which provides the ability to choose objects and individual surfaces of objects. Once selected, various haptic attributes of the object may be set as described in the next section. Attribute editing may be as simple as modifying a text entry of a number or as complex as the attribute setting capabilities described in U.S. application Ser. No. 08/859,157, which discloses the use of physical or graphics sliders, knobs, or other value generating graphical user interface (GUI) elements.

Haptic authoring according to this invention also preferably provides the capability to create, modify, and delete objects. As mentioned above, when using a force-feedback device, interesting new force-feedback cues may be used to aid the developer in manipulating and modifying the scene and objects. Some representative haptic cues include:

1. The use of forces to aid the user in moving a point to a particular discrete grid position (literally, 'snap' to grid—see FIG. 14).
2. The use of forces to aid the user in moving to a geometrical object control point of feature (end points of a line, center of a circle, radius of a circle, control points of a b-spline, etc).
3. The use of forces to resist stretching or compression of a feature (i.e. programmable stiffness or elasticity)— this would typically be implemented by a resistance to move a feature control point.
4. The use of forces (viscosity, friction, repulsive force) to resist the action of material addition (adding a new object over an old one with force resisting at the point of contact. This makes it easy to align the objects along a mutual boundary or side without knowledge of coordinate values needed for most equivalent operations using conventional CAD systems) or material removal (resistance to separation of two objects, or even depictions of carving or scraping operations to remove virtual material from virtual objects which would be analogical to physical removal of material from physical objects).
5. The use of forces to demark the locations of menu items, dialog response locations, and icons (similar to use of forces to aid in locating control points or grid locations).
6. The use of force to maintain orientation or positional constraints while performing another operation (for instance, if one were to move a virtual building, one might want to have the orientation, up, left, right to be maintained according to the gravity vector and the orientation of a city block structure; that is, X and Y would not be constrained but Z would be constrained by ground contacts—see FIG. 15).

Figure 16:
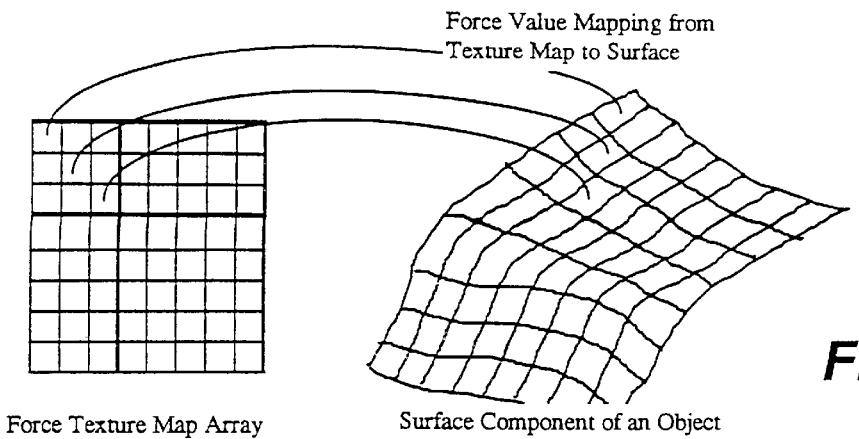
FIG. 16 is a force-texture map.

While the haptic author may individually set each attribute listed below, an important aspect of the editing process includes the selection from a pre-existing library of previously created groupings of attributes and their values. For example, a 'hardwood surface' may have a specific texture attribute (forces defined in an array located relative to a surface coordinate system—see FIG. 16) combined with a specific elasticity setting and a static/dynamic friction values. The authoring tool allows the author to create these groupings of settings, save them, and use previously created groupings.

Figure 17:
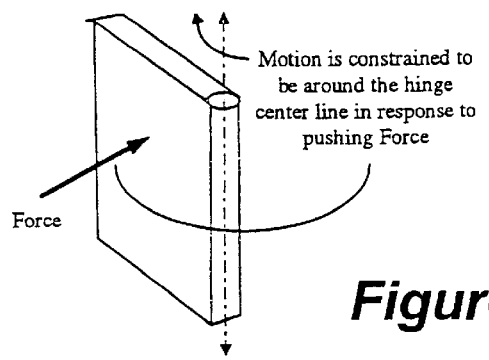
FIG. 17 illustrates a door-hinge motion constraint set.

In addition, higher level kinematic simulation models such as "hinge," which is a set of relationships that describe the motion and feel of a hinge as used on doors (FIG. 17), may be inserted by the author, with the authoring tool linking the author's control function parameters to the attribute setting mechanisms already included. This complex building of an object from simpler elements represents an object oriented construction method, and allows complexity encapsulation while supporting complex combinations.

Summary of Important Haptic Attributes

Haptic attributes specify the characteristics of an object that are 'displayed' or rendered by the force-feedback device, much as the color attribute is used to specify how the object is displayed visually. It is important to note that these haptic attributes are specified in a platform-independent manner (for any potential haptic device configuration), focusing on the essential concepts of the haptic interaction. The actual interpretation and implementation of these forces are determined by the specific platform and device capabilities.

The following haptic attributes represent a wide variety of physical interactions that a force-feedback device can render to a user. However, as will be apparent to one of skill, the concept of a haptic attribute and the way in which it attaches to object geometry generalizes to attributes not explicitly discussed herein. Not also that the attributes are specified at a high level, hiding the issues of low-level force-feedback control theory already described in U.S. Pat. Nos. 5,459,382, 5,389,865 and 5,629,594 using names and parameters that are intuitive to the developer. All attributes are attached to objects, though a particular object need not be visible from a particular haptic or visual view point, in order to exist in the world database and allow for the attachment of haptic attributes.

Currently there are at least five categories of attributes. Certainly this list of attributes will increase as more capabilities are added to specific scene description languages.

Interior Attributes—that describe forces once the user's avatar (the avatar is an object attached to the position specified by the haptic interface device's end point—i.e. is in some sense the user's persona in the virtual world) is inside a object (such as viscosity).

Surface Attributes—that describe force for when the user is in contact with the surface of a object (such as hardness).

Charge Attributes—that describe repulsive and attractive forces that may cover an area around the object (such as gravity).

Physical Attributes—attributes such as mass and its specific location in an object.

Constraint Attributes—attributes such as connection to other objects, and restricted area of motion.

Interior (Volume) Specifications

Viscosity—provides a sluggishness, such as various types of liquid.

Force/Torque—A constant vector of force/torque within the objects frame of reference.

Vibration—A periodic force that is parameterized (amplitude, frequency, etc.)

Effects—A playback of a force sample.

Surface (Geometric) Specifications

Elasticity—Resistance to penetration by Haptool

Deformation—Ability of a surface to retain its shape from penetration by Haptool Adhesiveness—Attraction of surface to Haptool when in contact.

Static Friction—Resistance to initial lateral movement when Haptool is in contact with object.

Dynamic Friction—Resistance to continued lateral movement when Haptool is in contact with object.

Thickness—Determines internal and surface regions for Haptool penetration.

1 dimensional Omni-directionalTexture—provides feels such as 'gritty' across an entire object, independent of the users direction of movement.

1 dimensional Uni-directional Texture—same as above except dependent of users direction of movement across surface of object, such as a 'ridges'.

2 dimensional Surface Texture—similar to texture mapping in 3D graphics, provides complete control over surface feels.

Charge Specifications

Charge Type—User defined type

Charge Position—Vector specifying location within objects frame-of-reference of the charge.

Charge Value—Actual magnitude of charge, including sign.

Charge Scalar—Scalar component of equation defining the force generated between 2 charges of the same type.

Charge Exponent—Exponential component of equation defining the force generated between 2 charges of the same type.

Physical Specifications

Mass Value—Point-mass magnitude.

Mass Offset—Vector specifying location of point mass within objects frame-of-reference.

Inertial Tensor

Constraint Specifications

Spring—Classic Spring-and-Damper representation.

Attachment—Type and its specification. Point, Line, or Plane.

Haptic Authoring - Avatar Specification

The avatar represents a user(s) in the virtual three dimensional space. The simplest implementations use the keyboard and mouse to directly navigate through the three dimensional space, with no explicit avatar representation. Alternatively, the user attaches to an iconic object which is moved through interaction with the haptic device. This iconic object is the avatar.

The user's avatar may take a variety of representations in the virtual space. It may be something as complex as a model of a car or human, or as simple as a hand or a wand. Regardless of the object, the object has a defined set of allowed motions that the user uses to navigate and interact with the world and object in it.

In addition to the avatar, the user has a variety of input devices to control the avatar and to control non-avatar interactions (such as menus, buttons, etc.). These input devices subset to mouse and keyboard, and include more complicated conventional input devices (touch pads, digitizers, light pen, etc.). Furthermore, the user use a force-feedback or haptic device, which allows for output through the device to also be displayed to the user through touch or pressure.

Transform Hierarchy

One important purpose of haptic authoring is to enable an author to define the mapping between the avatar and the control device for both input and output. At the core of this mapping is a concept used in three-dimensional scene descriptions, namely, the hierarchy of matrix transforms which translate and rotate components or objects from the fixed ground plane coordinate system. Once the user has specified this mapping, the avatar pointing/position output will be in the standard virtual world coordinates and thus will map to location fields contained in object description formats.

By representing both the avatar and a device as a hierarchy of matrix transforms, a mapping or associations of transforms from one to the other is possible. FIG. 11 shows an example object and a control device, their hierarchical transforms, and the association between them.

The haptic authoring tool presents the user with the transform hierarchy of a object and a device to intuitively allow for the specification of associations through a point-and-click type interface.

For each transformation in the hierarchy of transforms, there are a set of attributes that the user may specify. First, consider haptic device transforms. Each transform is associated with, at most, a single axis(1 degree of freedom) of a device. However, multiple transforms maybe attached to the same axis. These attributes determine how the input/output of each axis of the device determines the associated transforms matrix.

The following attributes are defined for each device transform:

Parent—Parent transformation.

Axis #—the physical axis that the transform is associated with for input and output.

Control Type—1 of three types position, velocity, or acceleration.

Degree of Freedom—The degree-of-freedom in Cartesian space x,y,z,rotx,roty,rotz that is associated to the Axis #

Low thresh—low thresh for control type, raw positions

High thresh—high thresh for control type position scaling k—linear scaling term for raw position read in.

position scaling e—exponential scaling term for raw position read in.

force scaling k—linear scaling term for force sent out.

force scaling e—exponential scaling term for force sent out.

In terms of object transform attributes, each object may be connected to the world coordinate system through a transform chain with the following attributes;

Parent—parent transformation.

Mode—indicates which matrix of the object transformation is modified: delta, relative, or absolute (delta is when the object is an offset from the prior position, relative is when the transform is expressed relative to its parent, and absolute is when the transform is expressed absolute).

Additional Issues in Haptic Authoring Architecture

Each haptic browser file produced by the authoring tool can stand alone or can include URL links which provide for the inclusion of entire haptic browser files from the same, or other, locations over a network like the World Wide Web. These URLs are links to potentially complete subworlds or objects and can be made from within the authoring tool (with view verification through the authoring systems' slave browser). The browser file can include dynamic objects with attached simulation or behavior descriptions (as in VRML 2.0), or as in VRML 1.0 can be totally static. The visual rendering of object components if performed in the conventional manner by visual rendering systems such as those included in Direct3D or OpenGL. However, the haptic rending component is accomplished using the data structures, methods, and procedures described herein.

Figure 18:
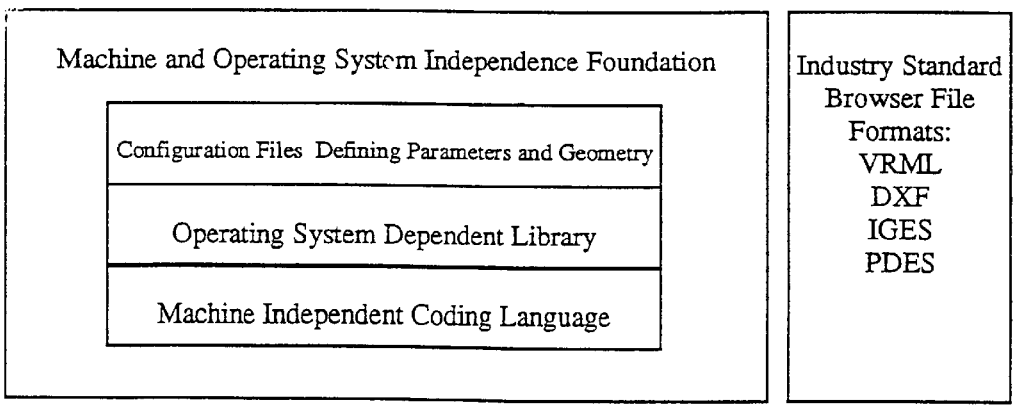
FIG. 18 is a diagram used to convey operating systems and computer systems independence.

Operating system and computer independence may be achieved through several methods, as shown in FIG. 18. First is use of a language for coding software which is available on each computer architecture supported, namely C and C++. Tuning to the specific machine of algorithms may be accommodated through configuration files which define constants, pre-computed forces and force sequences, and device geometry/characteristics. Operating system functions which differ, or are not built-in, may be coded separately. The graphics/haptics browser file formats can and, for the most part, are, defined for manipulation by any computer type. File format definitions for VRML, DXF, IGES, and PDES are defined in a standard way across industry users. These policies allow for platform independent operations of the force feedback system.

We claim:

1. A method of haptic authoring, comprising the steps of:
   developing a database describing one or more virtual objects in a virtual world, the database including geometric data facilitating object visualization;
   assigning haptic attributes to one or more of the virtual objects; and
   providing an interface enabling a user to both view and feel the objects to which the haptic attributes have been assigned.

2. The method of claim 1, further including the step of providing facilities for navigating and editing the database.

3. The method of claim 1, wherein the database is substantially encoded in a standard graphics format.

4. The method of claim 1, wherein the database and interface are co-resident on the same computer system.

5. The method of claim 1, wherein the database and interface are resident on different computer systems in communication over a network.

6. The method of claim 5, wherein the computer systems communicate through hyperlinks.

7. The method of claim 1, wherein the objects include both static and dynamic objects.

8. The method of claim 1, including one or more haptic attributes which resist stretching and compression to simulate object stiffness and elasticity.

9. The method of claim 1, including one or more haptic attributes enabling a new object to be positioned relative to an existing object with a resistive force at a point of contact between the two objects.

10. The method of claim 9, wherein the resistive force is viscosity.

11. The method of claim 9, wherein the resistive force is friction.

12. The method of claim 9, wherein the resistive force is repulsion.

13. The method of claim 1, including one or more haptic attributes associated with material removal.

14. The method of claim 1, including one or more haptic attributes which demark the locations of menu items, dialog response locations, and icons.

15. The method of claim 1, including one or more haptic attributes which maintain orientation or positional constraints while performing multiple operations.

16. The method of claim 1, further including the step of using a transform and object hierarchy for coding haptic world and object databases.

17. A method of haptic authoring, comprising the steps of:
   providing a computer system including a memory and a display device;
   storing, in the memory, a database including information which describes an object viewable on the display device;
   assigning a haptic attribute to the object in the database;
   providing a visual/haptic avatar;
   using the avatar to:
      a) visualize a user's position relative to the object, and
      b) interact with the object through touch; and
   editing the haptic attribute until achieving a desired tactical interaction using the avatar.

18. A method of haptic authoring in response to a user position and orientation, comprising the steps of:
   providing a computer system including a memory and a display device;
   storing, in the memory, information relating to a three-dimensional virtual world, the information including the description of a virtual object in terms of geometrical surface data enabling the object to be viewed on the display device, along with one or more attributes relating to touch;
   providing an avatar with multiple degrees of freedom enabling user position and orientation to be visualized on the display device in conjunction with the virtual object;
   determining user-applied force from the user position and orientation;
   mapping the user position, orientation and applied force into the virtual world to determine interactions between the user and the virtual object;
   generating a virtual reality force field in response to the interactions as a function of the stored attributes relating to touch;
   directing a tactile force on the user through the avatar in response to the virtual reality force field;
   editing the database until achieving a desired tactical force.

19. The method of claim 18, further including the steps of:
   defining a three-dimensional grid with discrete grid positions with respect to the virtual world; and
   moving to a particular discrete grid position in response to the user position, orientation and applied force.

20. The method of claim 18, wherein the object includes a control feature, the method further including the step of:
   snapping to the control feature in response to the user position, orientation and applied force.

21. The method of claim 18, wherein the control feature is an end-point.

22. The method of claim 18, wherein the control feature is the center of the object.

23. The method of claim 18, wherein the control feature is a control point of a b-spline.

24. An interative method for haptic authoring using an authoring tool software application, the method comprising:

reading a description file on a computer system by said authoring tool software application, said description file including a haptic attribute;

rendering said haptic attribute to a user using a force feedback device to allow said user to physically feel said haptic attribute, said rendering provided by said authorizing tool software application;

modifying said haptic attribute using said authoring tool software application, said modifying based on input from said user;

rendering said modified haptic attribute to said user using said force feedback device to allow said user to physically feel said modified haptic attribute, said rendering provided by said authoring tool software application;

repeating said modifying and rendering until said haptic attribute has a desired feel to said user; and writing an output description file including said modified haptic attribute having said desired feel, said writing performed by said authoring tool software application.

25. A method as recited in claim 24 wherein said haptic attribute is specified by a high level name and parameters and written to said output description file using said high level name and parameters.

26. A method as recited in claim 24 wherein said description file includes data describing graphical objects in a graphical environment.

27. A method as recited in claim 24 wherein said description file includes data describing the location or shape of graphical objects in a graphical environment.

28. A method as recited in claim 26 wherein said haptic attribute is associated with one of said graphical objects.

29. A method as recited in claim 24 wherein said description file is downloaded from a location on the World Wide Web.

30. A method as recited in claim 24 wherein said haptic attribute includes a viscosity parameter related to a simulated viscosity displayed by said force feedback device.

31. A method as recited in claim 24 wherein said haptic attribute includes a stiffness parameter related to a simulated stiffness displayed by said force feedback device.

32. A method as recited in claim 24 wherein said haptic attribute includes a friction parameter related to a simulated friction displayed by said force feedback device.

33. A method as recited in claim 24 wherein said haptic attribute includes a texture parameter related to a simulated texture displayed by said force feedback device.

34. A method as recited in claim 24 wherein said haptic attribute includes a hardness parameter related to a hardness of a simulated wall displayed by said force feedback device.

35. A method as recited in claim 24 wherein said haptic attribute includes a vabration parameter related to a simulated vibration displayed by said force feedback device.

36. A method as recited in claim 24 wherein said haptic attribute can be defined as an interior attribute which describe a feel of the inside of a graphical object.

37. A method as recited in claim 24 wherein said haptic attribute can be defined as a surface attribute which describe a feel of the surface of a graphical object visually displayed by said authoring tool software application.

38. A method as recited in claim 24 wherein said haptic attribure includes an attractive parameter related to a simulated attractive force displayed by said force feedback device with respect to a particular graphical object visually displayed by said authoring tool software application.

39. A method as recited in claim 24 wherein said haptic attribure includes a repulsive parameter related to a simulated attractive force displayed by said force feedback device with respect to a particular graphical visually displayed by said authoring tool software application.

40. A method as recited in claim 24 wherein said modifying includes selecting one of a plurality of objects provided in a graphical environment and assigning a haptic attribute to said selected object.

41. A method as recited in claim 40 wherein said selecting is based on input from said force feedback device used by said user.

42. A method as recited in claim 41 wherein a haptic cue is provided to said user that indicates said selection has occurred.

43. A method as recited in claim 42 wherein a graphical object is displayed representing said user's presence in said graphical environment for selecting said objects in said graphical environment.

44. A method as recited in claim 40 wherein said modifying further includes assigning haptic attributes to individual surfacs of said selected object.

45. A method as recited in claim 24 wherein said output description file is sent to a browser for parsing and display.

46. A method as recited in claim 25 wherein said haptic attribure is specified in a platform-independent manner.

47. A method as recited in claim 24 wherein said rendering said haptic attribute and said modified haptic attribute to said user is performed when an interaction with a graphical object occurs in a displayed graphical environment.

48. A method as recited in claim 24 further comprising providing a user interface for said authoring tool software application that uses force feedback cues to aid said user in knowing when objects are picked.

49. A method as recited in claim 24 further comprising providing a user interface for said authoring tool software application that uses force feedback cues to aid said user in physically snapping to grids displayed by said authoring tool software application.

50. A method as recited in claim 26 further comprising providing a user interface for said authoring tool software application that uses force feedback cues to aid said user in physically snapping to vertex points in said graphical environment.

51. A method as recited in claim 26 further comprising providing rendering modes including at least one of wireframe, shaded polygon, and texture mapping rendering modes.

52. An interative method for haptic authoring using an authoring tool software application, the method comprising:

setting a haptic attribute to be experienced by a user as a physical feel, said setting based on input from a user in said authoring tool software application;

rendering said haptic attribure to a user through a force feedback device to allow said user to physically feel said haptic attribute, said rendering provided by said authoring tool software application;

modifying said haptic attribute using said authoring tool software application, said modifying based on input from said user;

rendering said modified haptic attribute to said user through said force feedback device to allow said user to physically feel said modified haptic attribute, said rendering provided by said authoring tool software application;

repeating said modifying and rendering until said haptic attribute has a desired feel to said user; and writing said modified haptic attribute having said desired feel to a description file, said writing performed by said authoring tool software application.

53. A method as recited in claim 52 wherein said haptic attribute includes at least one of a viscosity parameter, a stiffness parameter, a friction parameter, a texture parameter, a hardness parameter, and a vibration parameter, each of said parameters related to a simulated force sensation provided by said force feedback device.

54. A method as recited in claim 52 wherein said description file includes a plurality of objects, and wherein said setting inlcudes selecting one of said plurality of objects includes in said graphical environment and then assigning a haptic attribute to said selected object.

55. A method as recited in claim 52 wherein said modified haptic attribute is rendered to said user immediately after said modification to shorten said authoring process.

56. A method as recited in claim 52 wherein said description file includes geometric data describing objects to be displayed visually.

57. A method as recited in claim 52 wherein said description file describes a 3D environment for presentation over the World Wide Web.

58. A method of haptic authoring, comprising:

providing a computer system including a memory and a display device;

storing, in said memory, a database including information which describes a first graphical object viewable on said display device;

assigning a haptic attribute to said first graphical object in said database;

providing a visual user-controlled second graphical object;

using said user-controlled second graphical object to:
  a) determine a user's position relative to said first graphical object, and
  b) interact with said first graphical object through touch, said touch provided with a force feedback device manipulated by a user, and editing said haptic attribute based on input from said user until a desired tactile interaction using said second graphical object is achieved.

* * * * *